United States Patent [19]

Sabatino et al.

[11] 4,253,332

[45] Mar. 3, 1981

[54] SEALED FLOW METER FOR IN-TANK INSTALLATION

[75] Inventors: Daniel D. Sabatino, Paramus; Henry W. Wilkens, Little Ferry, both of N.J.

[73] Assignee: Flowtron Industries, Inc., Little Ferry, N.J.

[21] Appl. No.: 71,159

[22] Filed: Aug. 30, 1979

[51] Int. Cl.³ .............................................. G01F 3/36
[52] U.S. Cl. ....................................... 73/224; 73/113
[58] Field of Search ................. 73/224, 113, 114, 221, 73/223; 137/391

[56] References Cited

U.S. PATENT DOCUMENTS

| | | | |
|---|---|---|---|
| 3,081,630 | 3/1963 | Willis | 73/224 |
| 3,101,614 | 8/1963 | Hubby | 73/224 |
| 3,189,036 | 6/1965 | Herbard | 73/224 |
| 3,714,823 | 2/1973 | Wilkens et al. | 73/113 |
| 3,937,083 | 2/1976 | Sabatino et al. | 73/224 |

Primary Examiner—Donald O. Woodiel

Attorney, Agent, or Firm—Pollock, Vande Sande & Priddy

[57] ABSTRACT

A liquid metering device comprises a sealed housing which defines a reserve chamber adjacent the bottom of the housing, and a measuring chamber within the housing above the reserve chamber. The measuring chamber has a pair of liquid-level sensors therein in spaced vertical relation to one another which cooperate with a control mechanism to feed liquid to be measured into the measuring chamber when the liquid level in the measuring chamber is adjacent the lower sensor, and to terminate the feeding of liquid into the measuring chamber while substantially simultaneously dumping liquid from the measuring chamber into the reserve chamber when the level of liquid in the measuring chamber rises to the level of the upper sensor. The free surface of the liquid in the measuring chamber is in direct pressure communication with the free surface of the liquid in the reserve chamber via an intervening air space in the sealed housing, whereby the bodies of liquid in the two chambers act as a pair of liquid pistons which reciprocate in opposing directions.

17 Claims, 5 Drawing Figures

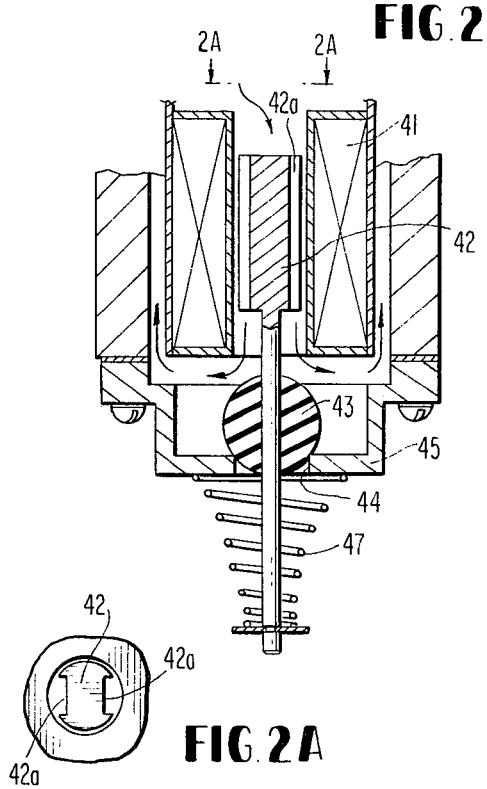
FIG. 2
FIG. 2A
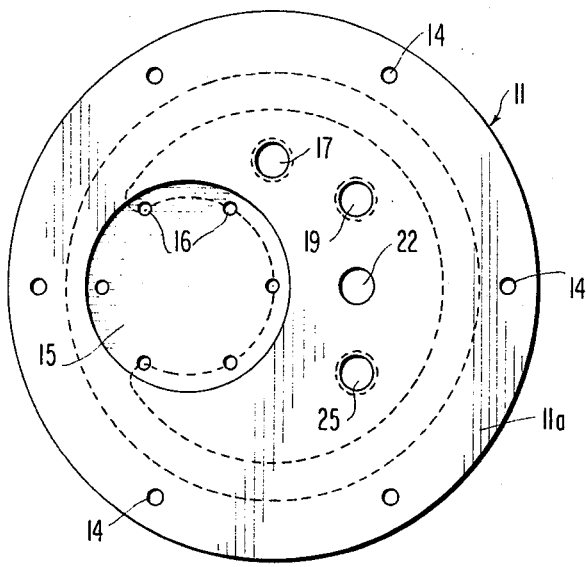
FIG. 3
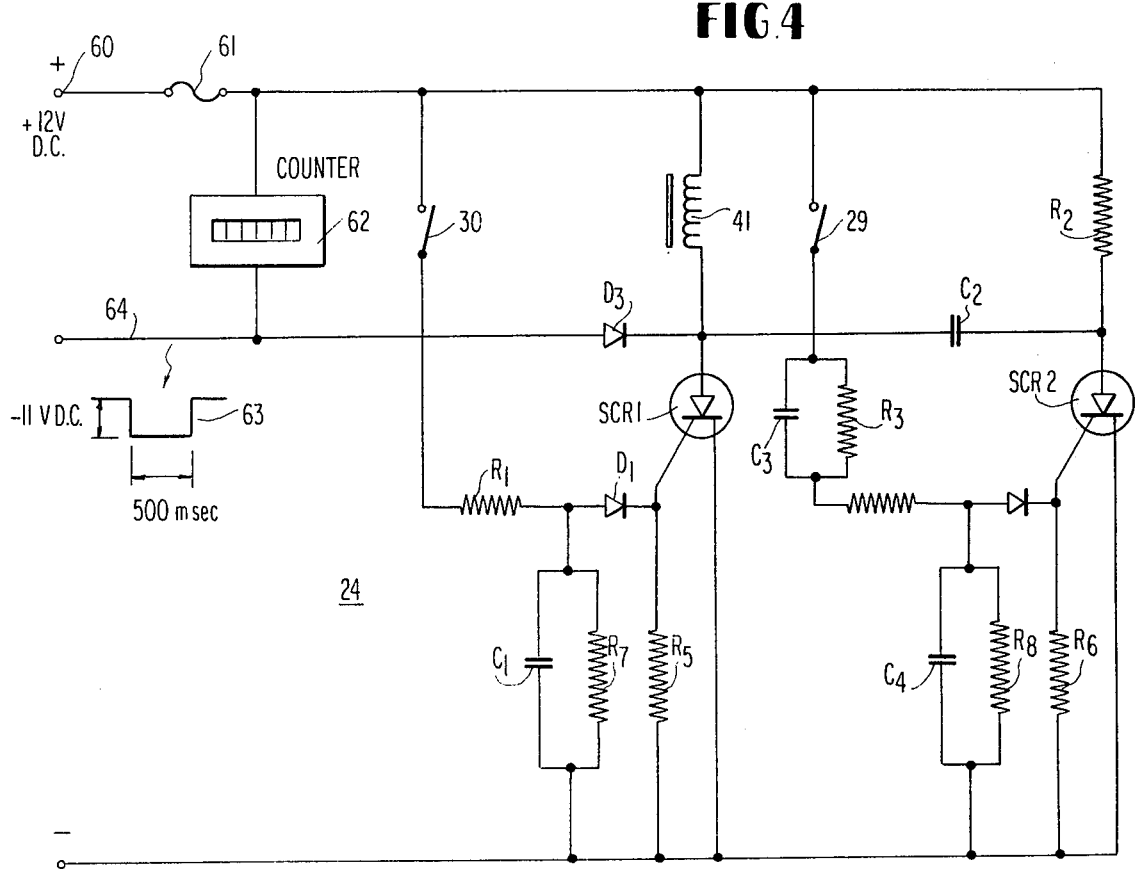
FIG. 4

SEALED FLOW METER FOR IN-TANK INSTALLATION

BACKGROUND OF THE INVENTION

The present invention comprises an improved, comparatively low-cost liquid metering device of the general type contemplated in our prior U.S. Pat. No. 3,714,823 issued Feb. 6, 1973, for "Fuel Consumption Meter" and U.S. Pat. No. 3,937,083 issued Feb. 10, 1976, for "Temperature-Compensating Liquid Meter". These known types of meters comprise a measuring chamber having a pair of liquid-level sensors therein which are disposed in vertically spaced relation to one another, and the metering device includes control means responsive to the absence of liquid in the measuring chamber at a first level determined by the lower one of the sensors for feeding liquid to be measured from a supply of said liquid to the measuring chamber, the control means being subsequently responsive to the presence of liquid in the measuring chamber at a second level determined by the upper one of the sensors for terminating the feeding of liquid into the measuring chamber and for substantially simultaneously withdrawing liquid from the measuring chamber until the level of said liquid in the measuring chamber falls to the said first level whereupon the withdrawal of liquid from the measuring chamber is terminated and liquid to be measured is again fed from the liquid supplied to the measuring chamber. By such operation, fixed increments of liquid to be measured, each of which increments is volumetrically dependent upon the vertical spacing between the sensors, are repetitively fed to and thereafter withdrawn from the measuring chamber; and a counter arrangement can be provided to count the number of increments of liquid which are withdrawn from the measuring chamber thereby to provide a digital measurement of fuel flow or, when the device is employed in a vehicle, to provide a digital measure of fuel consumption by the vehicle.

The arrangements which are contemplated in our prior patents are vented to atmospheric pressure wherefore, when used to measure fuel consumption in a vehicle, they have required a pump additional to the pre-existing fuel pump in the vehicle and, moreover, have been incapable of being located within the fuel tank of the vehicle itself. The present invention provides significant improvements in this respect since it employs a sealed housing arrangement which is adapted to be mounted directly in the fuel supply tank of a vehicle, thereby to secure the meter from leakage and to reduce the possibility of vandalism, and which employs components which are arranged to give a highly accurate digital or analog measurement of fuel or liquid flow by means of a metering device which is far lower in cost than metering devices suggested heretofore.

For purposes of the subsequent description, it will be assumed that the metering device of the present invention is used in conjunction with a motor vehicle; however the device of the present invention can measure any slow flowing liquid and can therefore be utilized as a general purpose flow meter. Moreover, the device of the present invention will be described in reference to an in-tank installation of the meter, which constitutes a preferred embodiment of the invention, but the sealed meter of the present invention can be mounted externally of the tank or other supply of liquid or fuel being measured.

SUMMARY OF THE INVENTION

The metering device of the present invention can best be described as constituting a unique from of positive displacement meter. Positive displacement meters have been known heretofore, but such meters typically utilize one or more pistons fabricated of a solid material, which pistons reciprocate in cylinders and require seals that wipe the cylinder walls to prevent the liquid being measured from leaking past the piston or pistons and causing an error in the measurement. The tighter these seals are in known positive displacement meters, the more accurate the meter will be; but increases in tightness of the seal suffer the disadvantage that increased liquid pressure is required to move the pistons within their respective cylinders.

In contrast to these known forms of positive displacement meter, the present invention provides a meter wherein liquid is sealed in two chambers, one above the other, creating two liquid pistons.

The upper chamber constitutes a measuring chamber which is operationally similar to the measuring chamber shown in our prior U.S. Pat. No. 3,937,083 in that it includes a liquid inlet for supplying liquid to be measured to the measuring chamber, a pair of vertically spaced liquid level sensors preferably of the reed switch type, and a magnet-carrying float which selectively actuates the switches in dependence upon the level of liquid in the measuring chamber. The lower chamber constitutes a reserve chamber which has been prefilled to a predetermined prime level with liquid of the type being measured, which is adapted to receive increments of liquid from the measuring chamber when the lower end of the measuring chamber is opened at appropriate times in a measuring operation, and which includes a liquid outlet line that extends from a position below the surface of the liquid in the reserve chamber to the exterior of the sealed housing in which the two chambers are located. In contrast to the arrangements of our prior patents, however, wherein the measuring chamber and reserve chamber are each vented to the atmosphere, the two chambers of the present invention are sealed within a common housing which includes therein an air space communicating the top of the measuring chamber to the reserve chamber so that changes in the pressure on the surface of the liquid in either chamber cause corresponding changes in the pressure on the surface of the liquid in the other chamber, to cause the liquid pistons in the two chambers to reciprocate substantially concurrently but in opposite directions as liquid is supplied to the measuring chamber and as liquid is withdrawn from the reserve chamber.

The measuring chamber of liquid piston reciprocates between levels defined by the two reed switch sensors during normal operation of the meter. As long as the liquid in the measuring chamber remains between these two levels, the liquid in the measuring chamber acts in precisely the same fashion as a piston fabricated of a solid material, but with the advantage that no wiping seals are required in conjunction with the pistons and with the further advantage that any air or vapor which is mixed into the liquid being measured can pass through the liquid piston without being measured. When the meter is placed on the positive side of a pump, the liquid piston in the measuring chamber acts as a driving piston, and as it moves up in the measuring chamber due to the force of the pump, it compresses the air which is sealed in the meter to apply pressure to the surface of the reserve chamber liquid piston thereby to force fuel out of the reserve chamber to the vehicle engine. Each time a given quantity of liquid is fed into the measuring chamber, e.g., one-one hundredth of a gallon, an equal quantity of fuel is forced out of the reserve chamber to the engine, whereafter that same quantity of fuel is replaced in the reserve chamber by gravity flow of fuel out of the measuring chamber into the reserve chamber as the liquid piston in the measuring chamber returns from its upper level to its lower level.

When the meter is on the pressure side of the pump, e.g., the fuel pump of a vehicle, the pressure from the pump is transmitted from the driving liquid piston in the measuring chamber to the compressed air in the sealed meter, and from the compressed air to the driven liquid piston in the reserve chamber with no pressure drop. Therefore, the pressure of the fuel at the outlet port from the reserve chamber is equal to pump pressure. This is in contrast to standard positive displacement meters wherein pump pressure is transferred through one or more solid pistons and one or more wiping seals that dissipate energy, thus creating a pressure drop that varies with flow rate.

The volume of the liquid which is present in the reserve chamber represents an important factor. The reserve chamber can be primed, prior to operation of the metering device, through a separate priming inlet port which can be sealed after an appropriate quantity of liquid has been supplied to the reserve chamber. In a preferred embodiment of the invention, however, self-priming is achieved by providing an air bleed hole in the fuel output dip tube at the height of the desired prime level. When the metering device is first placed in operation, air is continually forced through this bleed hole until the liquid level in the reserve chamber rises sufficiently to cover the bleed hole, at which time the priming operation ceases and the liquid level rises no further. The air bleed hole is thus a simple and effective way of achieving the proper prime level in the reserve chamber. If air should enter the meter during the measuring process, the liquid level in the reserve chamber will drop below the air bleed hole, and the excess air will be forced out of the bleed hole until the fluid level in the reserve chamber rises sufficiently to again cover the bleed hole.

The air pressure in the meter transfers the pump pressure to the liquid piston in the reserve chamber which, in turn, pressurizes the fuel-out port. Therefore, when the meter is installed on the pressure side of a pump, the liquid piston in the measuring chamber acts as the driving piston, and the liquid piston in the reserve chamber acts as the driven piston. When the meter is installed on the suction side of a pump, however, the liquid piston in the reserve chamber becomes the driving piston and, through the vacuum which is created in the meter when liquid is withdrawn from the reserve chamber, the liquid piston in the measuring chamber becomes the driven piston. In this latter arrangement, the suction of the pump is transmitted through the fuel-out dip tube to the liquid piston in the reserve chamber and, as the reserve chamber liquid piston is drawn down, it transfers the suction through the intervening air space to the liquid piston in the measuring chamber, drawing the measuring chamber liquid piston up until it reaches the upper sensor. At that point, a solid state control circuit forming a portion of the meter energizes a solenoid which activates a ball seal to close the measuring chamber against further ingress of liquid from the liquid supply, and to open the bottom of the measuring chamber so as to effect a gravity flow of the measured amount of liquid from the measuring chamber into the reserve chamber.

The two liquid pistons in the meter act, in effect, as a mechanical amplifier, i.e., they are designed so that a comparatively short stroke of the reserve chamber liquid piston translates to a longer stroke of the measuring chamber liquid piston. For example, a 1/100th gallon displacement of the reserve chamber liquid piston will be manifest in approximately 1/4th inch stroke of that reserve chamber liquid piston, while the same displacement of the measuring chamber liquid piston will be manifest in a substantially 2 inch stroke of the measuring chamber liquid piston. This ratio is a function of the respective diameters of the two liquid pistons, and the resultant amplification of motion constitutes a portion of the design of the present invention and increases the accuracy of the meter. The liquid level sensors in the measuring chamber can easily detect a stroke of 2 inches, and any minute errors in the sensor detection points, e.g., such as may be caused by shock or vibration during the measuring cycle, are well within the meter tolerances and have substantially no effect on the accuracy of the metering function inasmuch as they represent only a very small percentage of the comparatively large stroke exhibited by the liquid piston in the measuring chamber.

The arrangement of the present invention is accordingly one wherein two liquid pistons function in a manner wherein liquid is measured by the reciprocations of one piston while the reciprocations of the other piston provide a continuous supply of liquid, e.g., a continuous supply of fuel to a vehicle engine. The liquid pistons function with no friction or wear, wherefore the meter can operate with practically no pressure or suction even in a gravity flow system. Pressure or suction is transferred to the meter with no measurable loss. In contrast to solid piston positive displacement meters, which require close tolerances and machined surfaces to provide an accurate metering operation, the liquid pistons employed in the present invention can seal and function properly in cylinders without machining wherefore the metering device of the present invention can be manufactured for a fraction of the cost of positive displacement meters suggested heretofore.

Moreover, the two chamber design which characterizes the present invention can be installed in systems that circulate and use a liquid, and which return unused liquid to the metering device, without measuring the liquid being used more than once. Other designs require one meter in the feed line, and one meter in the return line, with means being provided for subtracting the two readings to obtain a measure of the liquid actually consumed or used.

In contrast to the metering arrangements described in our prior patents, identified above, the present invention constitutes a sealed meter which incorporates a measuring chamber and a reserve chamber so associated with one another as to allow liquid or fuel in the measuring chamber to empty by gravity flow directly into the reserve chamber. The two chambers, moreover, share the same air space within the sealed meter so that the air pressure in the measuring chamber is always the same as the air pressure in the reserve chamber. Since both the measuring and reserve chambers are at the same sealed air pressure within the meter, unmeasured liquid will enter the measuring chamber at the rate at which liquid is drawn from the reserve chamber, enters and fills the measuring chamber before the solenoid valve is activated, and, since the measuring and reserve chambers are at the same pressure, can be quickly dumped by gravity flow from the measuring chamber into the reserve chamber in a very short period of time, e.g., one-half second.

The reserve chamber is capable of being primed to a predetermined level and, after priming, supplies the measured liquid to an appropriate utilization facility, e.g., a vehicle engine. Unused liquid, such as returned fuel from a diesel engine, may be cycled back to the reserve chamber an unlimited number of times without affecting the measuring process inasmuch as the return flow bypasses the measuring chamber.

The design thus provides for an inexpensive, accurate measurement of a slow flowing liquid. Although the present invention is primarily intended to provide a digital electrical pulse for each increment of fuel measured, the measuring chamber can also provide an analog signal equal to the rate of flow, since the measuring chamber is being filled at that rate.

BRIEF DESCRIPTION OF THE DRAWINGS

The foregoing objects, advantages, construction and operation of the present invention will become more readily apparent from the following description and accompanying drawings wherein:

FIG. 2 is a detail of a portion of the structure shown in FIG. 1, with the valving mechanism at the bottom of the measuring chamber in position to supply liquid being measured to the measuring chamber;

FIG. 2a is a cross-sectional view taken on line 2a—2a of FIG. 2;

FIG. 3 is a top view of the measuring device of the present invention; and

FIG. 4 is a schematic diagram of a control circuit employed in the present invention.

DESCRIPTION OF THE PREFERRED EMBODIMENTS

Figure 1:
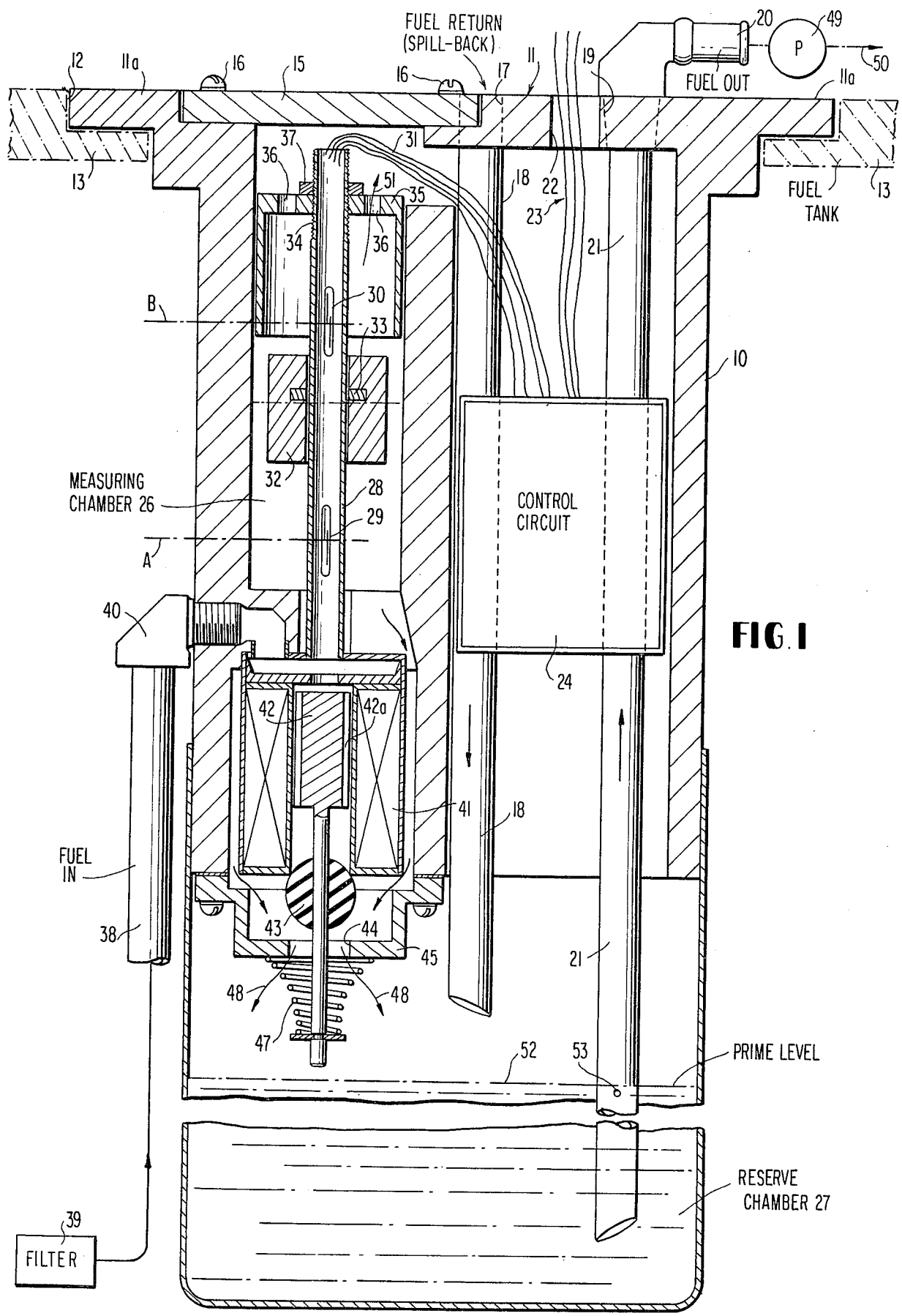
FIG. 1 is a cross-sectional view of a measuring device constructed in accordance with the present invention, with the valving mechanism at the bottom of the measuring chamber shown in its open position to dump fuel from the measuring chamber into the reserve chamber.

Referring to the several figures, like numerals of which refer to like parts throughout, the improved meter of the present invention comprises a sealed housing 10, preferably circular in cross section, the upper wall 11 of which is provided with an outstanding flange 11a adapted to be seated within a complementarily shaped hole 12 in the upper surface of a vehicle fuel tank 13, to support the sealed housing 10 and the metering structure contained therein within the said tank 13. In practice, the tank 13 is provided with a hole in its top, and the metering device is lowered into that hole until it is completely within the tank 13, supported at the top of the tank by flange 11a, and then bolted in place through bolt holes 14 best shown in FIG. 3.

The upper wall 11 of the sealed housing is further provided with a circular closure plate 15 which overlies the metering chamber of the device, said plate 15 being held in place by bolts 16 which permit the plate 15 to be selectively removed for purposes of trimming the volume of the metering chamber (as will be described) and/or for purposes of servicing the metering device. In addition, said upper wall 11 is provided with an opening 17 through which a spillback line 18 extends for the return of unused fuel directly to the reserve chamber of the metering device; a hole 19 in which a fuel outlet line 20 is mounted, the said fuel outlet line 20 being connected to a dip tube 21 that extends within the sealed housing 10 from the top of the metering device to a location adjacent the bottom thereof below the level of fuel in the reserve chamber of the device; a further opening 22 through which conductors 23 may extend from a control circuit 24 within the metering device to an external counter (to be described in reference to FIG. 4); and a further opening 25 which constitutes a priming port for filling the reserve tank to a predetermined prime level in one embodiment of the invention. When the priming port 25 is provided, it may be associated with a fill tube located within the sealed housing 10 extending downwardly to a position adjacent the reserve reserve chamber; but this particular arrangement is optional, and need not be provided when the self-priming arrangement to be discussed hereinafter is utilized.

It will be understood by those skilled in the art that the various openings provided in the upper wall 11 of the housing are associated with appropriate seal means which preserve the sealed integrity of the housing 10, but these seal means have not been illustrated in the drawings.

The interior of the sealed housing 10 defines two chambers which are disposed one above the other, i.e., a measuring chamber 26 and a reserve chamber 27. These two chambers are preferably cylindrical in configuration, with the diameter of the measuring chamber 26 being less than that of the reserve chamber 27; and these two chambers always contain quantities of a liquid to be measured, e.g., fuel, therein which are in sealing engagement with the sides of the respective chambers and which act, in the manner described previously, as a pair of liquid pistons.

A support tube 28 is disposed centrally within the measuring chamber 26 for supporting in position a pair of magnetically responsive reed switches 29 and 30 which are connected via conductive lines 31 to the control circuit 24. A float 32 having a magnet 33 embedded therein is slidable vertically along the exterior of support tube 28 as the fuel in measuring chamber 26 varies between a lower level designated A (defined by the location of reed switch 29) and the level designated B (defined by the positioning of upper reed switch 30, the levels A and B representing the limits of the measuring chamber liquid piston.

The upper end of support tube 28 is threaded, as at 34, and is in thread engagement with an inverted cup 35, which acts as a fluid displacing device to trim the actual volume of fluid which is being metered by the measuring chamber 26. The inverted cup 35 is provided with holes 36 in its top surface to avoid entrapment of air within the measuring chamber 26, and to assure that the top of the measuring chamber is in direct pressure communication with the reserve chamber 27 through the air space which is located within sealed housing 10 to the right (as viewed in FIG. 1) of the measuring chamber. In practice, before the metering device is put into operation the closure plate 15 is removed, inverted cup 35 is adjusted in position on support tube 28 to trim the measuring chamber 26 precisely to a desired increment of fuel, e.g., 0.01 gallons, and the cup is then fixed in place by a locking nut 37.

A fuel inlet line 38, one end of which is provided with a filter 39 located within the tank 13, is threaded into a side wall of sealed housing 10 by a fitting 40 at a position below the lower end of the measuring chamber 26. The flow of fuel from inlet line 38 into measuring chamber 26 is controlled by a solenoid 41 which is provided with an armature 42 the sides of which are recessed as at 42a (see FIG. 2a) to provide passages for the flow of fuel past the sides of the armature 42; and the lower end of armature 42 supports a rubber ball 43 which is adapted to selectively seat in an orifice 44 provided in a plate 45 that is bolted to the bottom of the measuring chamber 26. The armature 42 and ball 43 are normally urged into a closed position (as shown in FIG. 2) by a coil spring 47; and said orifice 44 is selectively opened by energization of solenoid 41 which operates to retract armature 42 against the force of spring 47 (as shown in FIG. 1) to permit the gravity discharge of a measured quantity of fuel from the measuring chamber 26 directly into the reserve chamber 27, e.g., as shown by arrows 48 in FIG. 1.

In the particular embodiment of the invention shown in FIG. 1, the fuel outlet line 20 is connected to the suction side of a pump 49 to deliver fuel from reserve chamber 27 through dip tube 21 to the vehicle engine along the path generally designated 50. The pump 49 may comprise the pre-existing fuel pump in the vehicle. The particular arrangement shown in FIG. 1, wherein the metering device is on the suction side of the fuel pump 49, would typically be employed in diesel and fuel injection engine arrangements, and in other arrangements wherein the metering device is recessed within a fuel tank. However in other applications of the invention, and in applications where the metering device is mounted externally of the tank, the pump can be located between the supply of liquid being metered and the fuel inlet line 38, so that the metering device is on the pressure side of the pump.

In operation, for the particular embodiment of the invention shown in FIG. 1, when the engine on the vehicle or other fuel consuming device is started, fuel is drawn out of the reserve chamber 27 due to the action of fuel pump 49, and passes out of the sealed housing 10 via dip tube 21 and fuel outlet line 20 thereby developing a negative pressure inside of the sealed housing in the air space between measuring chamber 26 and reserve chamber 27. The fuel which is present in fuel tank 13 is at atmospheric pressure, and the negative pressure which has been created within the sealed housing accordingly causes fuel to be drawn into the meter through filter 39 and fuel inlet line 38 to replenish the amount of fuel which has been consumed. More particularly, assuming that the level of fuel in the measuring chamber 26 is at this time at the level designated A (FIG. 1), the fuel enters the metering device via fitting 40, and then passes along the path designated by arrows in FIG. 2, i.e., along the passageways 42a in solenoid armature 42, downwardly past and around the bottom of the solenoid coil 41, and then upwardly through passageways provided along the exterior sides of the solenoid coil 41 into the bottom of the measuring chamber 26. As the fuel continues to fill measuring chamber 26, float 32 rises until magnet 33 reaches a position adjacent upper reed switch 30, at which time reed switch 30 closes to energize solenoid coil 41. The energization of the solenoid coil 41 raises armature 42 and ball 43 to the position shown in FIG. 1, to close off any further intake of fuel from the tank 13, and to simultaneously open orifice 44 against the force of spring 47 so that the measured quantity of fuel dumps by gravity flow directly into the pre-existing quantity of fuel in reserve chamber 27. As the fuel is drained out of the measuring chamber 26, the float 32 moves downwardly, and eventually reaches a position wherein magnet 33 closes lower reed switch 29 to de-energize solenoid coil 41 via control circuit 24, whereupon armature 42 and ball 43 are pulled downwardly into the closed position by spring 47, thereby to again permit fuel to be drawn into the measuring chamber 26.

The foregoing operation continues as long as the engine is consuming fuel. The rate at which the measuring chamber 26 is filled is dependent upon the engine demand, but the rate of discharge from the measuring chamber 26 into reserve chamber 27 is a constant. Each time upper reed switch 30 is activated, a signal is provided by control circuit 24 which steps a counter (see FIG. 4) to indicate the consumption by the vehicle engine of a specific volumetric measure of fuel.

The design of the metering device is such that, in the event of a power failure, the ball 43 is held in its lower position (FIG. 2) by the force of spring 47, and the engine will continue to operate inasmuch as the fuel drawn continuously into the measuring chamber 26 will fill that chamber beyond upper level B, pass through holes 36 in the trimming cup 35, and then spill over the top of the measuring chamber (as indicated by arrow 51 into the reserve chamber 27. As a result, a supply of fuel is maintained in reserve chamber 27, for feeding via dip tube 21 and pump 49 to the vehicle engine. Fuel that is supplied to the engine, but not consumed, is returned to the reserve chamber 27 through spillback line 18 which is so located that the spillback fuel bypasses the measuring chamber thereby to avoid any error in the normal measuring operation. In addition, it should be noted that inasmuch as the top of the measuring chamber is in direct communication with an air space within sealed housing 10, any air or other vapors which may be mixed into the fuel being metered can bubble out of the measuring chamber 26 through the supply of fuel therein during the measuring operation, to avoid any inaccuracy in the measurement due to the presence of such air or vapor.

The fuel which is located in measuring chamber 26 never falls below the level designated A nor, in normal operation, does it ever rise above the level designated B. Accordingly, there is always a quantity of fuel located within the measuring chamber 26, in sealing engagement with the sides of that chamber, so that, as the fuel level rises and lowers the fuel in measuring chamber 26 acts as a liquid piston which is in sealing engagement with the sides of the measuring chamber. Similarly, since a supply of the liquid or fuel being measured is provided in the reserve chamber 27 before a measuring operation is started, and since the supply of fuel in reserve chamber 27 is replenished as it is drawn out of the reserve chamber via dip tube 21, there is always a quantity of fuel in reserve chamber 27 whose level rises and lowers as the metering operation and fuel consumption continues. The liquid or fuel which is in reserve chamber 27 is in sealing engagement with the walls of that chamber, and acts as a second liquid piston, having a diameter which is greater than that of the liquid piston in measuring chamber 26, which reciprocates concurrently with, but in opposite direction and through a smaller distance, the reciprocations of the liquid piston in measuring chamber 26.

The volume of liquid which is provided in the reserve chamber is important. The metering device is ordinarily primed to a prime level designated 52 in FIG. 1, located below the lower end of the measuring chamber, e.g., by filling a quantity of fuel through priming port 25 (FIG. 3), and thereafter sealing said priming port closed, before the metering operation commences. However in a preferred embodiment of the invention, a self priming arrangement is provided to assure not only that fuel to a desired level is present in reserve chamber 27 before a metering operation commences, but to further assure that the prime level is maintained as the metering operation continues thereby to avoid difficulties which might arise if, for example, air should somehow leak into the interior of the field housing 10.

The self priming arrangement comprises an air bleed hole 53 (approximately 0.03 inches in diameter) which is drilled through a side wall of dip tube 21 at a position above its lower end corresponding to the desired prime level 52. Assuming that there is no fuel at all in reserve chamber 27, e.g., when the device of the present invention is first placed into operation, increments of fuel are dumped into the reserve chamber from measuring chamber 26, to fill the reserve chamber toward the prime level 52. So long as the fuel in reserve chamber 27 is below bleed hole 53, operation of pump 49 will draw comparatively small amounts of fuel out of the reserve chamber along with air which is drawn from the air space within housing 10 through bleed hole 53. This operation continues until the level of fuel in reserve chamber 27 rises to the prime level 52, slightly above bleed hole 53, whereupon the balance of air is trapped within the meter due to the fact that bleed hole 53 is now covered with fuel. If air should enter the meter during the subsequent metering operation, the liquid level in reserve chamber 27 will drop below air bleed hole 53, and the excess air will be forced out of the housing 10 via bleed hole 53 until the hole 53 is again covered with the liquid or fuel being metered, at which time the liquid level will rise no further. As a result, the measuring device is self priming in operation, and maintains the desired prime level automatically during the metering process.

The control circuit 24 is shown in FIG. 4, and operates to assure that once the solenoid coil 41 is energized the ball 43 is held in its "up" position until the measured fuel increment is completely dumped from measuring chamber 26 into reserve chamber 27. The chamber 26 is never completely emptied of fuel, however, and a certain amount of fuel is always present in chamber 26 between level A (FIG. 1) and the bottom of ball 43 at port 44, to prevent the introduction of air into the measuring chamber which could cause turbulence, and to provide the liquid piston sealing function in the measuring chamber already described.

The control circuit employs a pair of silicon controlled rectifiers SCR1 and SCR2 to switch power from a 12 vDC supply 60 to the coil 41 of the solenoid valve at the precise moment to achieve an accurate dispensing of the liquid being measured. As is well known, an operational characteristic of an SCR is that it remains in a conducting state after the trigger signal is removed, provided the voltage applied thereto is DC; and this characteristic assures that power is continuously applied to solenoid coil 41 during the dispensing cycle of the measuring chamber, to insure that the solenoid remains energized until the liquid reaches level A.

In operation, the voltage from source 60 is applied to control circuit 24 through a circuit breaker 61 when the ignition switch of the vehicle (not shown) is turned on. Circuit breaker 61 is of the manual reset type, and is designed to open if the circuit draws current continuously for more than 30 seconds.

When the upper reed switch 30 is closed by the float/magnet assembly 32, 33, voltage is supplied through circuit breaker 61, switch 30, and a resistor $R_1$ to charge a capacitor $C_1$; and when the voltage charge on $C_1$ builds to a sufficiently high level, it is applied through a diode $D_1$ to the gate electrode of SCR1 to fire SCR1 and thereby energize coil 41 of the solenoid valve. At the same time, a circuit is completed across the counter 62 through diode $D_3$ to provide a digital square wave pulse (shown at 63) to the counter 62, to increment the counter by one thereby to indicate that a measured increment, e.g., 0.01 gallons has been measured and supplied to the reserve chamber; and the pulse 63 can also be supplied via a line 64 to one or more remote counters or other monitoring devices if the same are provided.

The triggering of SCR1 into its conductive condition, in addition to energizing solenoid coil 41 and providing a pulse to counter 62, completes a charging circuit across a capacitor $C_2$ whereby capacitor $C_2$ is charged via resistor $R_2$ to the voltage of supply 60 during the time that it takes to empty the measuring chamber 26 to the point where reed switch 29 is closed by the float/magnet combination 32, 33. When reed switch 29 is closed in this fashion, it completes a circuit which discharges capacitor $C_2$ through SCR1 in the opposite polarity. Since upper reed switch 30 opens prior to the closure of lower reed switch 29, the discharge of capacitor $C_2$ through SCR1 cuts off SCR1 thereby de-energizing solenoid coil 41. As a result, ball 43 is pulled by spring 47 back into sealing contact with port 44, to close said port 44 against further drainage of fuel out of the measuring chamber, and to open the inlet to the measuring chamber so that fuel can be supplied thereto from fuel inlet line 38. This fill and dump cycle repeats itself at the rate that liquid is drawn from the reserve chamber 27.

After $C_2$ has been charged in the manner described previously, its discharge acts as a current source for SCR2 to fire SCR2, but SCR2 cuts itself automatically after $C_2$ has been discharged due to the fact that resistor $R_2$ is so large that insufficient current can be supplied through $R_2$ to maintain SCR2 in conduction. The RC time constant circuit $C_3$ $R_3$ prevents SCR2 from conducting continuously due to an excessively long closure of lower reed switch 29, e.g., if the float should remain at the bottom of the measuring chamber for a long period of time. When the lower reed switch 29 closes, a pulse passes through $C_3$ to charge capacitor $C_4$ and fire SCR2, but continued voltage is not applied to capacitor $C_4$ due to the comparatively high value of resistor $R_3$.

Resistor $R_5$ provides a negative bias to the gate electrode of SCR1 to prevent triggering of SCR1 due to external electrical noise, and a similar function is performed by resistor $R_6$ in respect to SCR2. Resistor $R_7$ cooperates with capacitor $C_1$ to provide an RC time constant circuit which delays the firing of SCR1 for a short increment of time, to assure that SCR1 is not fired due to a momentary closure of reed switch 30 due, for example, to shock or vibration; and a similar function is performed by the RC time constant circuit $C_4 R_8$ with respect to SCR2 and reed switch 29.

While the circuit shown in FIG. 4 operates to provide a digital electrical impulse for each increment of fuel measured, thereby to provide, in cooperation with the remainder of the structure previously described, an inexpensive but accurate measurement of a slow-flowing liquid, other types of measurement circuits can be employed, e.g., the circuit can be arranged to provide an analog signal equal to the rate of flow of fuel into the measuring chamber 26, since the measurement chamber is filled at that rate of flow.

While we have thus described preferred embodiments of the present invention, many variations will be apparent to those skilled in the art. It must therefore be emphasized that the foregoing description is intended to be illustrative only and not limitative of the present invention, and all such variations and modifications as are in accord with the principles described are meant to fall within the scope of the appended claims.

Having thus described our invention, we claim:

1. In a liquid metering device of the type comprising a measuring chamber having a pair of liquid-level sensors therein disposed in vertically spaced relation to one another, said metering device including control means responsive to the absence of liquid in said measuring chamber at a first level determined by the lower one of said sensors for feeding a liquid to be measured from a supply of said liquid to said measuring chamber, said control means being subsequently responsive to the presence of said liquid in said measuring chamber at a second level determined by the upper one of said sensors for terminating the feeding of said liquid into said measuring chamber and for withdrawing liquid from said measuring chamber until the level of said liquid in said measuring chamber falls to said first level whereupon the withdrawal of liquid from said measuring chamber is terminated and said liquid to be measured is again fed from said liquid supply to said measuring chamber, whereby fixed increments of said liquid each of which is volumetrically dependent upon the vertical spacing between said sensors are respectively fed to and thereafter withdrawn from said measuring chamber, the improvement wherein said measuring chamber is mounted within a sealed housing, said housing also including a reserve chamber therein disposed below said measuring chamber, said control means including means selectively operable to dispense liquid from the bottom of said measuring chamber into said reserve chamber by gravity flow of said liquid out of said measuring chamber, said housing including a liquid outlet line extending into the liquid in said reserve chamber for feeding liquid out of said reserve chamber, the top of said measuring chamber always being in communication with said reserve chamber via an air space within said housing and between said chambers whereby the pressure above the surface of the liquid in said measuring chamber is always the same as the pressure above the surface of the liquid in said reserve chamber, pumping means located exterior of said sealed housing for changing the pressure in said air space to a pressure other than atmospheric pressure, said supply of liquid being external to said sealed housing and being at atmospheric pressure, and a liquid inlet line extending from said supply of liquid to the measuring chamber within said sealed housing operative in response to a pressure differential between the liquid in said supply and the liquid in said measuring chamber, created by operation of said pumping means, to feed liquid from said supply under the control of said control means into said measuring chamber and to feed liquid out of said reserve chamber via said outlet line.

2. The liquid metering device of claim 1 wherein said supply of liquid constitutes a tank of said liquid, said sealed housing being located within said tank, and said liquid outlet line extending from said sealed housing to the exterior of said tank.

3. The liquid metering device of claim 2 wherein said sealed housing has an upper flange adapted to be attached to the top of said tank, said sealed housing depending from said flange into said tank.

4. The liquid metering device of claim 2 wherein said tank is the fuel tank of a vehicle, said pumping means being the fuel pump of said vehicle and being connected to said liquid outlet line for selectively reducing the pressure above the surface of the liquid in said reserve chamber and in said air space to a pressure below atmospheric pressure.

5. The liquid metering device of claim 4 wherein said metering device includes a spill-back line for the return of fuel which is supplied to but unused by the vehicle engine, said spill-back line being positioned within said sealed housing to feed spill-back fuel from the vehicle engine directly into said reserve chamber bypassing said measuring chamber.

6. The liquid metering device of claim 2 wherein said sealed housing includes priming means for supplying liquid to a predetermined level in said reserve chamber prior to operation of said metering device.

7. The liquid metering device of claim 6 wherein said metering chamber is located adjacent the top of said sealed housing, said reserve chamber being located adjacent the bottom of said sealed housing, said liquid outlet line extending vertically within said sealed housing from the top of said housing to a position adjacent the bottom of said reserve chamber.

8. The liquid metering device of claim 7 wherein said priming means comprises an orifice in a side wall of said liquid outlet line disposed in vertically spaced relation to the bottom of said reserve chamber at the desired priming level in said reserve chamber.

9. The liquid metering device of claim 1 wherein said pumping means is connected between said supply of liquid and said liquid outlet line for supplying liquid under pressure to said measuring chamber, the increase in pressure above the surface of said liquid in said measuring chamber due to the action of said pumping means producing via said air space a corresponding increase in the pressure above the surface of the liquid in said reserve chamber operable to force liquid out of said reserve chamber via said outlet line.

10. The liquid metering device of claim 1 wherein said pumping means is connected to said outlet line for drawing liquid out of said reserve chamber, the decrease in pressure in said air space above the surface of said liquid in said reserve chamber as liquid is withdrawn therefrom by said pump producing a corresponding decrease in the pressure above the surface of the liquid in said measuring chamber operable to draw liquid from said supply of liquid into said measuring chamber via said liquid inlet line.

11. The liquid metering device of claims 9 or 10 wherein said supply of liquid is the fuel tank of a vehicle, said pumping means being the fuel pump of said vehicle.

12. The liquid metering device of claim 10 wherein said supply of liquid is the fuel tank of a vehicle, said sealed housing being mounted within said fuel tank.

13. The liquid metering device of claim 11 wherein said measuring chamber includes side walls which extend above said second level and which define an open top for said measuring chamber above said second level which is in liquid flow communication with said reserve chamber whereby, in the event of malfunction of said metering device, fuel fed into said measuring chamber spills from the open top of said measuring chamber into said reserve chamber to provide a continuous supply of fuel in said reserve chamber which is fed via said outlet line to the engine of said vehicle.

14. A liquid metering device comprising a sealed housing having means therein defining first and second interior chambers, said first chamber being a measuring chamber which is located within said housing above said second chamber, said second chamber being a reserve chamber containing a quantity of the liquid being measured by said metering device, the surface of the liquid in said reserve chamber being below the bottom of said measuring chamber, a supply of liquid to be measured located exterior of said housing, control means responsive to the absence of liquid in said measuring chamber at a first level above the bottom of said measuring chamber for closing the bottom of said measuring chamber and for feeding liquid from said supply into said measuring chamber via a liquid inlet in said sealed housing to cause the liquid in said measuring chamber to rise as a first liquid piston toward a predetermined second level in said measuring chamber, said control means being responsive to the presence of liquid at said second level for terminating the feeding of liquid into said measuring chamber and for substantially simultaneously opening the bottom of said measuring chamber to cause liquid therein to drop by gravity flow from the bottom of said measuring chamber into said reserve chamber until the surface of the liquid in said measuring chamber returns to said first level whereupon said control means is operable to close the bottom of said measuring chamber and to again feed liquid from said supply into said measuring chamber, whereby said first liquid piston reciprocates between said first and second levels, an outlet line extending from said reserve chamber to the exterior of said sealed housing for withdrawing liquid from said reserve chamber, the top of said measuring chamber being in direct pressure communication with the surface of the liquid in said reserve chamber via an air space within said housing between the tops of said chambers whereby pressure changes at the surface of the liquid in said measuring chamber as liquid is fed into and withdrawn from said measuring chamber are accompanied by like pressure changes at the surface of the liquid in said reserve chamber to cause the liquid in said reserve chamber to act as a second liquid piston which reciprocates concurrently with but in opposite direction to the reciprocations of said first liquid piston, the volumetric changes in said first and second liquid pistons during the reciprocations of said liquid pistons being identical to one another.

15. The metering device of claim 14 wherein said supply of liquid is at atmospheric pressure, and pumping means located between said supply and said liquid inlet for supplying liquid under pressure to said measuring chamber to increase the pressure in said air space and above the surface of the liquid in said reserve chamber to a pressure in excess of atmospheric pressure.

16. The metering device of claim 14 wherein said supply of liquid is at atmospheric pressure, and pumping means connected to said outlet line for reducing the pressure in said air space to a pressure below atmospheric pressure as liquid is withdrawn from said reserve chamber.

17. The metering device of claim 14 wherein each of said chambers is substantially cylindrical, the diameter of said metering chamber and of said first liquid piston being less than the diameter of said reserve chamber and of said second liquid piston.

* * * * *